J. M. AUBERY.
AUXILIARY AIR INLET DEVICE FOR INTERNAL COMBUSTION ENGINES.
APPLICATION FILED AUG. 28, 1911.
1,050,200.
Patented Jan. 14, 1913.
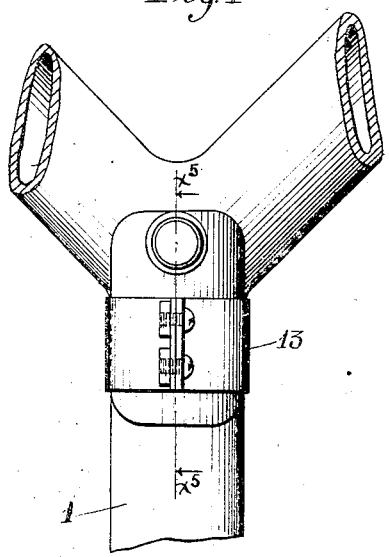
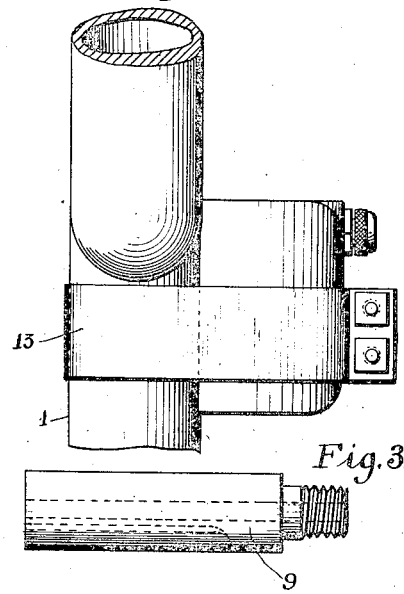
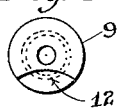
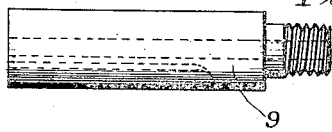
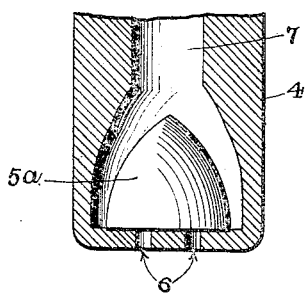
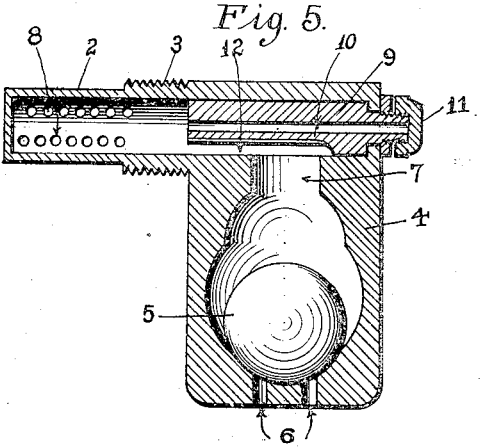

UNITED STATES PATENT OFFICE.

JAMES MADISON AUBERY, OF LOS ANGELES, CALIFORNIA.

AUXILIARY AIR-INLET DEVICE FOR INTERNAL-COMBUSTION ENGINES.

1,050,200.   Specification of Letters Patent.   Patented Jan. 14, 1913.

Application filed August 28, 1911. Serial No. 646,534.

*To all whom it may concern:*

Be it known that I, JAMES M. AUBERY, a citizen of the United States, residing at Los Angeles, in the county of Los Angeles and State of California, have invented a new and useful Auxiliary Air-Inlet Device for Internal-Combustion Engines, of which the following is a specification.

This invention relates to a device adapted to be attached to the induction pipe of an internal combustion motor, at a point between the carbureter and inlet valves, and the object of the device is to regulate the inlet of auxiliary air by an automatically operating valve which does not depend for its operation upon springs which are uncertain in action, but relies in its operation upon gravity.

A further object is to provide for firmly supporting the device, thereby relieving the air inlet nipple of unnecessary strain.

A further object is to provide for introducing a decarbonizing agent directly into the induction pipe without passing the same through the carbureter.

Referring to the drawings: Figure 1 is a front elevation of the device, showing it applied to the induction pipe. Fig. 2 is a side elevation of what is shown in Fig. 1. Fig. 3 is an enlarged view in detail of the decarbonizing valve. Fig. 4 is an end view of the decarbonizing valve. Fig. 5 is an enlarged section on line $x^5$—$x^5$ Fig. 1. Fig. 6 is a view of the valve portion of the device, showing a modification.

1 designates the induction pipe into which the air inlet nipple 2 is screwed, the latter being threaded at 3, and arranged at right angles to a valve chamber 4, the latter depending below the air inlet nipple, the latter standing horizontally. Within the chamber 4 is a valve 5 which normally rests at the bottom of the chamber 4, and closes air inlet ports 6. When the engine is in operation, however, the suction in the induction pipe 1 raises the valve 5, overcoming its weight, and auxiliary air rushes in at 6 and passes through a passage 7 into the nipple 2 and out through perforations 8, into the induction pipe 1. Perforations 8 are staggered as shown, to produce a breaking up effect on the air, causing it to enter uniformly into the induction pipe.

A decarbonizing valve 9 is revolubly mounted above the chamber 4 and has a central passage 10 which is normally closed by a cap 11. The valve 9 also has a passage 12 in one side thereof, as clearly shown in Fig. 4, and normally, the valve is so set that passage 12 gives communication between chamber 4 and air inlet nipple 2. When, however, it is desired to introduce a decarbonizing agent, such, for example, as kerosene, the valve 9 is turned to shut the passage 7 and the cap 11 is removed. This enables kerosene to be drawn in through the passage 10 and delivered through the perforations 8 into the induction pipe and thence carried into the combustion chamber of the engine.

In order to support the device a strap 13 may be carried around the induction pipe 1 and chamber 4, as clearly shown in Figs. 1 and 2. This relieves the nipple 2 of all strain and prevents breakage.

As the valve 5 operates by gravity, its action is comparatively certain and the device can not easily get out of order.

The spherical shape of the valve 5 is not essential, as the valve may be any preferred shape, for example, it may be conical, as shown in Fig. 6.

The adjustment of the action of the valve 5 and amount of air admitted is obtained by regulating the valve 9 to open or close the passages 12 and 7. Thus, when passages 12 and 7 are restricted there will be less suction on the valve 5 and less air admitted, while when passages 12 and 7 are fully open the maximum suction will be exerted on valve 5 and maximum amount of air can pass through the passages 12 and 7.

What I claim is:

1. An auxiliary air inlet device, comprising a valve casing adapted to be secured to the induction pipe of the motor, and having a valve chamber and provided with an air inlet, the said chamber communicating with the induction pipe, and a valve in said chamber normally resting by gravity over said air inlet, the connection from said casing to the induction pipe comprising an air inlet nipple extending from the casing into the induction pipe, said nipple having staggered perforations therein, a revoluble decarbonizing valve in the upper part of the valve casing and having a port communicating with said valve chamber, and regulated in size by turning the decarbonizing valve.

2. An auxiliary air inlet device, comprising a valve casing adapted to be secured to the induction pipe of the motor, and having a valve chamber and provided with an air inlet, the said chamber communicating with the induction pipe, and a valve in said chamber normally resting by gravity over said air inlet, the connection from said casing to the induction pipe comprising an air inlet nipple extending from the casing into the induction pipe, said nipple having staggered perforations therein, a revoluble decarbonizing valve in the upper part of the valve casing and having a port communicating with said valve chamber, and regulated in size by turning the decarbonizing valve, said decarbonizing valve having a longitudinal passage and a cap covering the outer end of said passage.

In testimony whereof, I have hereunto set my hand at Los Angeles, California this 23d day of August, 1911.

JAMES MADISON AUBERY.

In presence of—
G. T. HACKLEY,
GLADYS RUSSELL.